Figure 1:
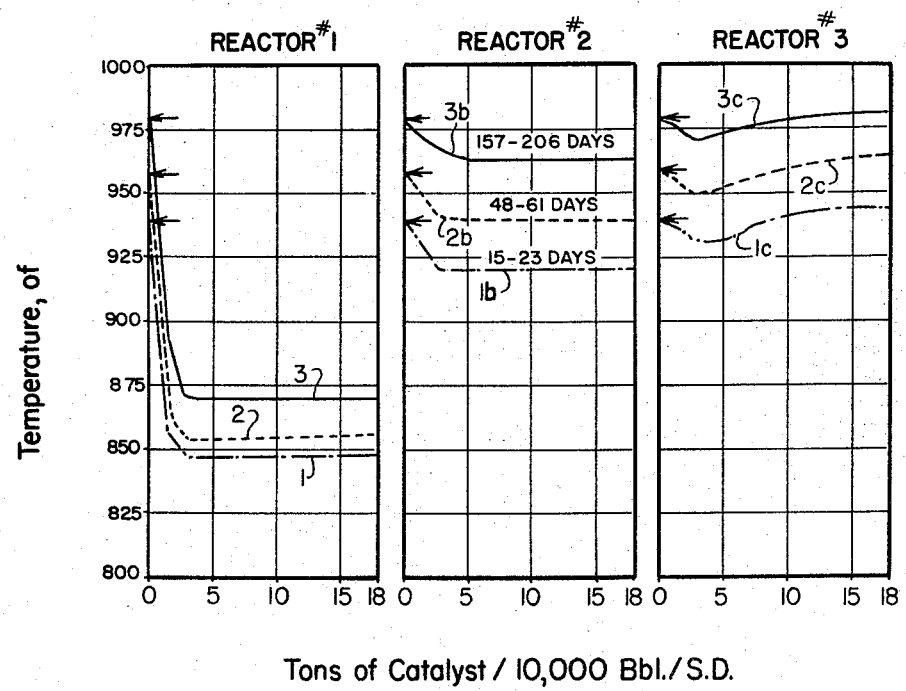

July 26, 1960 A. E. POTAS 2,946,737
REACTOR TEMPERATURE EFFECT IN REFORMING
Filed Sept. 6, 1957 4 Sheets-Sheet 1

FIG. I

INVENTOR.
Anthony E. Potas
BY
AGENT

United States Patent Office 2,946,737
Patented July 26, 1960

2,946,737
REACTOR TEMPERATURE EFFECT IN REFORMING

Anthony E. Potas, Wenonah, N.J., assignor to Socony Mobil Oil Company, Inc., a corporation of New York Filed Sept. 6, 1957, Ser. No. 682,361

6 Claims. (Cl. 208—65)

The present invention relates to reforming and, more particularly, to reforming naphthas to produce gasolines having octane ratings (research+3 cc. TEL) in excess of 100.

Presently, the generally preferred reforming catalyst is the particle-form solid platinum-type reforming catalyst typified by a platinum reforming catalyst comprising about 0.1 to about 10 weight percent platinum on carrier comprising alumina. When reforming a naphtha, e.g., straight run or cracked or a mixture thereof over a platinum catalyst such as described hereinbefore, it is general practice to employ the so-called adiabatic system of reactors with reheating between reactors in a system employing a plurality of reactors. In general, the vapor inlet temperature to each reactor is usually about the same and dependent upon the age or activity of the catalyst and the quantity of the catalyst and the required octane of the gasoline produced in the unit. That is to say, the vapor inlet temperature is dependent upon the composition of the charge stock, the hydrogen to hydrocarbon ratio, the space velocity and the distribution of catalyst in the plurality of reactors. In the past it has been general practice to employ a total catalyst charge for a 10,000 barrel a day unit, i.e., a unit to which 10,000 barrels of naphtha are charged per day, of about 50–60 tons distributed equally among three reactors. When producing gasoline having octane ratings (research+3 cc. TEL) less than 100 such equal distribution of the catalyst has little or no effect upon the yield of gasoline. However, it has been found that, when gasoline having octane ratings (research+3 cc. TEL) of 100 or more are produced employing a plurality of adiabatic reactors in which the catalyst is distributed equally, the yield of gasoline having octane ratings (research+3 cc. TEL) of 100 or more can be increased an economically important amount by decreasing the time during which the naphthene-containing charge naphtha is in contact with the particle-form platinum-type reforming catalyst at temperatures below the autogenous quench point. However, when producing a gasoline having octane ratings (research+3 cc. TEL) less than 100, e.g., 90–98, the time during which the naphthene-containing charge naphtha is in contact with the particle-form platinum-type reforming catalyst at temperatures below the autogenous quench point appears to have no readily detected effect upon the yield of gasoline. In other words, it has been found that economically important yields of gasoline having octane ratings (research+3 cc. TEL) in excess of 100 can be obtained by reducing the time of contact of the naphthene-containing naphtha with the platinum-type particle-form solid reforming catalyst at temperatures below the autogenous quench point to a minimum, preferably zero, while the time of contact between the charge naphtha substantially devoid of naphthene and the platinum-type particle-form solid reforming catalyst at temperatures below the autogenous quench point appears to be solely dependent upon the residence time required to dehydrocyclicize and/or crack and/or isomerize the paraffins present in the substantially naphthene-free charge naphtha to the extent required to raise the octane rating (research+3 cc. TEL) to the required 100 or more.

That is to say, the reforming of a naphthene-containing charge naphtha containing, for simplicity, naphthenes, aromatics and paraffins can be considered to comprise dehydrogenation of the naphthenes to aromatics, in the first stage and dehydrocyclicization, isomerization and cracking of the paraffins in the second stage. It would appear that the aromatic hydrocarbons originally present in the charge naphtha and the aromatic hydrocarbons produced by dehydrogenation of the naphthenes originally present in the charge naphtha are relatively stable and not readily cracked by contact with the platinum-type particle-form catalyst at temperatures below the aforesaid autogenous quench point. On the other hand, it would appear that naphthenes crack or otherwise decompose into hydrocarbons having much lower octane ratings than the aromatic hydrocarbons produced by dehydrogenation of the same naphthenes when in contact with particle-form, platinum-type reforming catalyst at temperatures at which aromatic hydrocarbons are stable. Accordingly, in accordance with the principles of the present invention, a naphthene-containing charge stock is exposed to temperatures below the autogenous quench point a minimum interval of time or the residence time of a naphthene-containing charge stock in contact with a particle-form platinum-type reforming catalyst at temperatures below the autogenous quench point is reduced to a minimum or preferably eliminated.

In U.S. Patent No. 2,654,694 C. V. Berger describes the economical distribution of catalyst in two or more reactors treating a straight run gasoline having an F–2 (motor method) octane number of 40 to raise the octane rating to 75 when using a platinum catalyst. According to the disclosure of this patent when reforming a substantially olefin-free gasoline using a platinum catalyst the economical utilization of the minimum amount of catalyst is obtained when passing the gasoline to be reformed through a series of three reaction zones containing separate beds of catalyst by proportioning the catalyst among said zones so that the second zone of the series contains a quantity of catalyst at least equal to that in the first zone of the series and the third zone of the series contains a greater quantity of catalyst than the second zone. This patentee also discloses that the temperature pattern in the three zones should be as follows: the inlet temperature of the gasoline fraction is correlated with the amount of catalyst in each zone to obtain a temperature drop in the third zone less than the summation of the temperature drops in all three zones divided by 3, and a temperature drop in each of the first two zones that is greater than the summation of the temperature drops in all three zones divided by 12. In other words, if the quantity of catalyst in the first zone is one unit, then the quantity of catalyst in the second zone is at least one unit but may be greater, and the quantity of catalyst in the third zone is greater than the quantity of catalyst in the second zone. This can be expressed as a proportion in this manner $$R_3 > R_2 > = R_1$$

It has now been discovered that the optimum distribution of catalyst in a multi-zone reforming unit is not the same when producing gasoline having an octane number (RON+3 cc. TEL) in excess of 100 as when producing gasoline having an octane number (RON+3 cc. TEL) less than 100. That is to say, the optimum distribution of catalyst when employing a plurality of reaction zones and reheating intermediate successive zones is a function of reforming severity. However, catalyst distribution and reforming severity have little effect upon the temperature pattern in the different reaction zones. Thus, a pretreated Mid-Continent naphtha was reformed to produce a gasoline having a leaded (3 cc. TEL) octane number of 98 employing three reaction zones and reheating of the naphtha between the first and second reforming zones and between the second and the third reforming zones. The platinum-type catalyst was distributed in one operating period in the proportion of 1:1:1. In the other operating period, the catalyst was distributed in the proportion of 1:1:2. The same pretreated Mid-Continent naphtha was reformed in the same manner under more severe conditions to produce gasoline having a leaded octane number of 104. In one operation the catalyst distribution in the three reforming zones was in the proportion of 1:1:1 and in the other operation was 1:1:2. The temperature patterns for the four operating periods are set forth in Table I.

TABLE I

[Feed: Pretreated Mid-Continent naphtha. Boiling range 200° F. to 330° F. Leaded octane (3 cc. TEL) 72]

| Reformate Leaded Octane Number | Catalyst Distribution | Reactor No. 1, ΔT, ° F. Inlet-Outlet | Reactor No. 2, ΔT, ° F. Inlet-Outlet | Reactor No. 3, ΔT, ° F. Inlet-Outlet |
|---|---|---|---|---|
| 98 | 1:1:1 | −101 | −35 | −5 |
| 98 | 1:1:2 | −113 | −39 | −9 |
| 104 | 1:1:1 | −101 | −20 | +3 |
| 104 | 1:1:2 | −122 | −31 | +6 |

Thus, it is manifest that catalyst distribution has little, if any, effect upon the temperature pattern of the three reactors as a group.

As stated hereinbefore it is generally accepted that, in reforming naphtha over a platinum-type particle-form solid reforming catalyst, reforming can be considered as taking place in two stages, each of which is characterized by a predominating reaction or perdominating reactions. In the first stage the predominating reaction is the endothermic dehydrogenation of naphthenes to aromatics. In the second stage the predominating reactions are dehydrocyclization or aromatization together with isomerization and hydrocracking of the paraffins.

While the ideal reactor for reforming naphtha over a platinum-type particle-form solid reforming catalyst is an isothermal reactor, for practical purposes an isothermal reactor is less desirable than a plurality of adiabatic reactors arranged and provided with reheaters to reheat the reactor effluent of each reactor to reaction temperature before introduction of the heated reactor effluent into the next successive adiabatic reactor. For practical purposes the number of adiabatic reactors is limited to about 2 to 12.

Since the heat of an endothermic reaction in an adiabatic reactor having a static bed must be supplied by the incoming feed and recycle gases and since thermal conversion of a naphtha produces a gasoline of lower octane number than a gasoline produced by catalytic conversion over a platinum-type catalyst, the amount of heat that can be introduced in the inlet vapors into an adiabatic reactor is limited. As a consequence, regardless of the amount of catalyst contacted by the naphtha in the first adiabatic reactor the first or dehydrogenation stage of the reforming reaction is rarely completed before it is necessary to reheat the naphta to a naphtha dehydrogenation temperature. The temperature at which cessation of the reaction occurs is often called the "quench point."

It has now been found that the quench point, hereinafter designated "autogenous quench point" is a means of characterizing operations leading to improved yields or gasoline having leaded octane numbers (RON+3 cc. TEL) of about 100 or higher.

The autogenous quench point is that point in the reaction at which, although there are naphthenes present in the reactor contents which have not been dehydrogenated, the dehydrogenation reaction for all practical purposes ceases. The temperature of the autogenous quench point varies with the age or activity of the catalyst, the vapor inlet temperature, and the composition of the charge naphtha but the autogenous quench point is independent of the age of the catalyst, the vapor inlet temperature and the mol ratio of hydrogen-to-naphtha charged. This is manifest from a study of the temperature profile curves of Figures 1, 2 and 3.

*The determination of the autogenous quench point*

The autogenous quench point is determined by means of temperature profile curves for the first reactor. Temperature profile curves are plotted from data obtained by measuring the inlet temperature of the naphtha vapors introduced into the first adiabatic reactor and the reactor temperatures at various distances measured from the vapor inlet toward the naphtha outlet of the reactor. The distance which the vapors have travelled through the catalyst bed in the first reactor or reaction zone from the naphtha inlet to the level at which the temperature of the catalyst bed and vapors is measured is expressed either by a lineal unit, e.g., feet, or in tons of catalyst per unit of naphtha passed through the catalyst bed in a unit of time, e.g., tons of catalyst per 1000 barrels of naphtha charged per stream day. For practical purposes of design the latter method of expressing the relation is preferred and the unit employed is tons of catalyst per 10,000 barrels of naphtha per stream day.

*The autogenous quench point is independent of the age of the catalyst, the vapor inlet temperature, and the mol ratio of recycle gas to naphtha charged*

The autogenous quench point is that point on a temperature profile curve of the first reactor of a plurality of reactors made during the reforming of a charge naphtha at which the direction of the temperature profile curve changes from approaching vertical to the ordinate to approaching or substantially parallel to the ordinate.

The curves of Figure 1 were plotted from data obtained while reforming Mid-Continent naphtha in the presence of a hydrogen-containing recycle gas and a platinum-type catalyst to 104 octane (research+3 cc. TEL) at 500 p.s.i.g., at a hydrogen-to-naphtha mol ratio of 10/1, and at a liquid hourly space velocity of 1. It will be observed that the direction of curve 1 changes from approaching vertical to the ordinate at the level in the catalyst bed in the first reactor corresponding to about 3 tons of catalyst per 10,000 barrels of naphtha charge per day. In other words, the point of inflection for curve 1 is at the level corresponding to about 3 tons of catalyst per 10,000 barrels of naphtha charged per day. Since curve 1 represents the temperature-catalyst quantity relation during the interval between the 15th and the 23rd day, and curve 2 represents the temperature-catalyst quantity relation during the interval between the 48th and the 61st day, and curve 3 represents the temperature-catalyst quantity relation during the interval between the 157th and 206th day, it is manifest that the autogenous quench point is independent of the age of the catalyst.

Upon examination of curves 1, 2 and 3 of Figure 1 for the first reactor it will be observed that during the first interval (15-23 days) for which data is presented the vapor inlet temperature was 940° F. For the second interval for which data is presented the vapor inlet temperature was 960° F. For the third interval for which data is presented the vapor inlet temperature was 980° F. Nevertheless, the autogenous quench point for all three curves is at the level corresponding to 3 tons of catalyst per 10,000 barrels of naphtha charged per day. Thus, the autogenous quench point is independent of the vapor inlet temperature.

Figure 2:
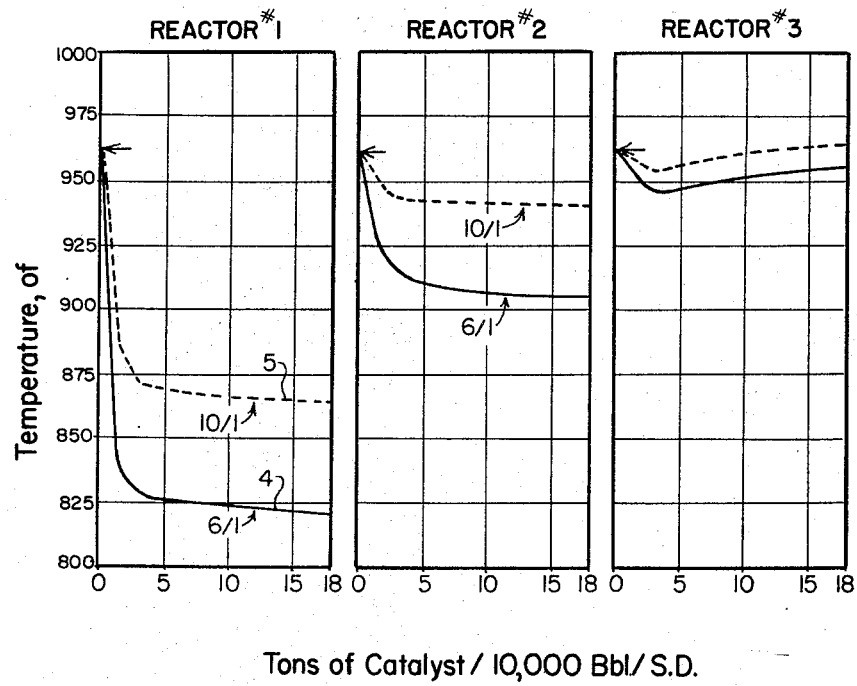

The curves presented in Figure 2 were plotted from data obtained while reforming pretreated Mid-Continent naphtha in the presence of a hydrogen-containing recycle gas and a platinum-type catalyst to 103 O.N. (research+3 cc. TEL) at 500 p.s.i.g. and at a liquid hourly space velocity of 1 but at two different hydrogen-to-naphtha mol ratios. Curve 4 represents the relation between temperature and catalyst quantity in the first reactor when the hydrogen-to-naphtha mol ratio is 6/1. Curve 5 represents the same relation when the hydrogen-to-naphtha mol ratio is 10/1. The point of inflection indicating the autogenous quench point occurs on each curve at a level corresponding to 3 tons of catalyst per 10,000 barrels of naphtha charged per day. Hence, the autogenous quench point is independent of the hydrogen-to naphtha ratio.

Curves 1, 2 and 3 for Reactor No. 2 of the series of adiabatic reactors also indicate a quench point and indicate the final cessation of the reaction involving dehydrogenation of the major portion of the balance of the naphthenes in the charge naphtha.

It will be observed that regardless of the age of the catalyst, i.e., the on-stream period, regardless of the vapor inlet temperature and regardless of the hydrogen-to-naphtha ratio, the "autogenous quench point" occurs at substantially the same catalyst-to-oil ratio. That is to say, the "autogenous quench point" occurs when the naphtha has contacted the catalyst in the first reactor in a ratio of about 3 tons per 10,000 barrels per day regardless of the age of the catalyst and the vapor inlet temperature.

*The autogenous quench point is independent of the composition of the naphtha charged*

Figure 3:
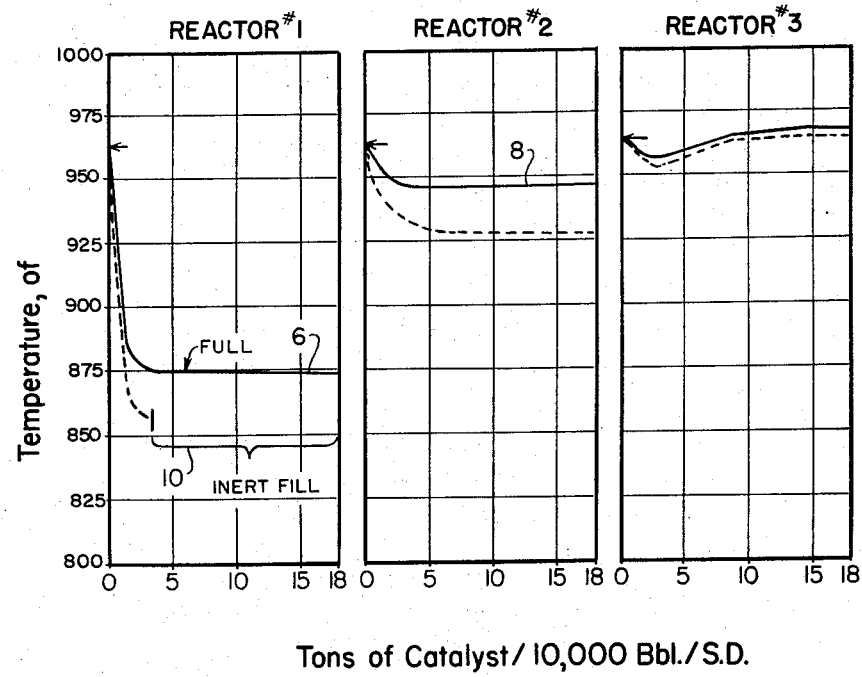

In the following discussion, reference will be made to Figures 3 and 4. The data from which the curves in Figure 3 were obtained when reforming pretreated Mid-Continent naphtha to 104 O.N. (research+3 cc. TEL) in the presence of a hydrogen-containing recycle gas and a platinum-type catalyst at 500 p.s.i.g., with a hydrogen-to-naphtha mol ratio of 10/1 and a liquid hourly space velocity of 1. The point of inflection of curve 6 occurs at a level corresponding to about 3 tons of catalyst per 10,000 barrels of naphtha charged per day.

Figure 4:
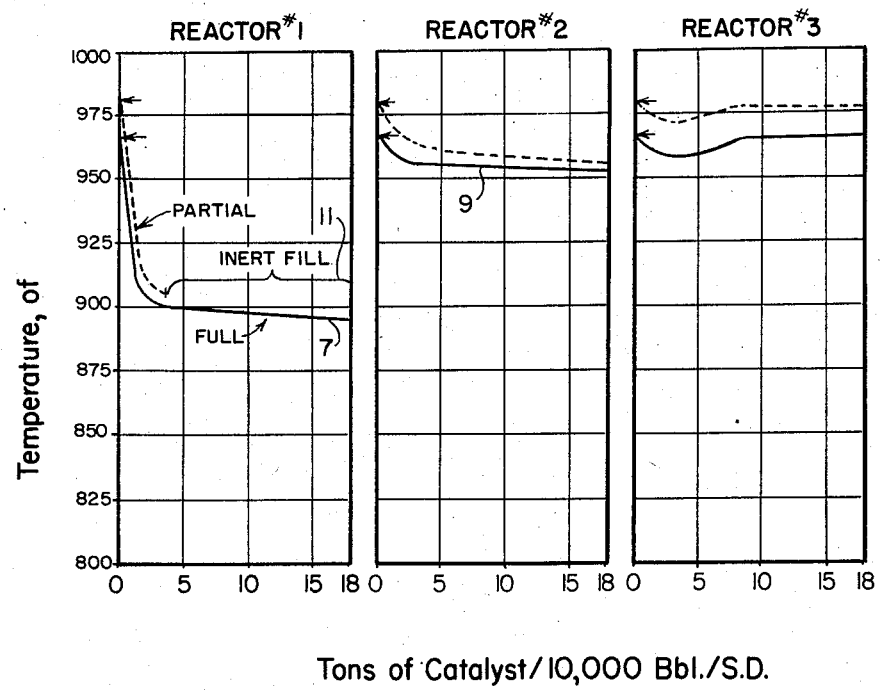

Curve 7 of Figure 4 was plotted from data obtained when reforming pretreated Kuwait naphtha to 104 O.N. (research+3 cc. TEL) in the presence of the same platinum-type catalyst which was used to reform the Mid-Continent naphtha to which reference has been made hereinbefore. The Kuwait naphtha was reformed at 500 p.s.i.g., a hydrogen-to-naphtha mol ratio of 10/1 and a liquid hourly space velocity of 1. The point of inflection of curve 7 occurs at a level corresponding to about 3 tons of catalyst per 10,000 barrels of naphtha charged per day.

These naphthas have the following compositions:

| | Mid-Continent | Kuwait |
|---|---|---|
| Naphthenes, Percent Volume | 45 | 27 |
| Paraffins, Percent Volume | 48 | 61 |
| Aromatics, Percent Volume | 7 | 12 |
| | 100 | 100 |

It will be observed that although the Mid-Continent naphtha contains about 1.7 times as much naphthenes as the Kuwait naphtha the autogenous quench point, as measured by the point of inflection of the temperature profile curve, in both instances occurs at a level corresponding to about 3 tons of catalyst per 10,000 barrels of naphtha charged per day. However, the maximum drop in temperature in the first reactor is dependent upon the naphthene content of the charge naphtha as is manifest from the following tabulation:

| | Mid-Continent | Kuwait |
|---|---|---|
| Vapor Inlet Temperature, ° F | 965 | 965 |
| Autogenous Quench Point, ° F | 875 | 900 |
| Temperature Differential, ° F | 90 | 65 |

Since the autogenous quench point measures the maximum temperature differential, it follows that the maximum temperature differential in the first reactor will be dependent upon the naphthene content of the charge naphtha other variables, such as catalyst activity, being the same.

It has now been discovered that further contact of a charge naphtha containing naphthenes with a platinum-type reforming catalyst after the naphtha has reached the autogenous quench point results in a loss of yield of leaded gasoline having an octane rating of 100 or more. This was established by subjecting a mixture of normal heptane and methylcyclohexane to contact with a platinum-type reforming catalyst at various temperatures and measuring the total cyclic components of the mixture. The results are presented in the following tabulation:

[Charge: 50±1 mol percent normal heptane. 50±1 mol percent methylcyclohexane]

| Contact Temperature, ° F | 903 | 846 | 785 | 739 |
|---|---|---|---|---|
| Total $C_6$ Cyclics, Percent Volume | 49.4 | 48.9 | 46.8 | 45.8 |

From this it follows that the amount of catalyst with which the charge naphtha is contacted in the first reactor until a major portion of the naphthenes has been dehydrogenated or until the reactor temperature falls to the autogeneous quench point must be a minimum for the maximum temperature differential between the vapor inlet temperature and the autogenous quench point in the first of a plurality of adiabatic reactors.

*Variables affecting total amount of catalyst required*

The total amount of platinum-type reforming catalyst employed is dependent primarily on the practical length of the on-stream time for economical operation. The on-stream time is dependent upon the rate at which the vapor inlet temperature required to produce the final product having the required octane rating rises during the on-stream period to the limiting temperature. The limiting temperature is that at which thermal conversion occurs or that at which catalyst deactivation occurs, whichever is the lesser tmeperature. The on-stream time therefor is limited by the initial vapor inlet temperature required to produce a final product having the required octane rating and the rate at which that vapor inlet temperature must be raised to maintain the octane rating of the final product.

The space velocity preferably is the maximum permitted to produce a final product having the required octane rating. Thus, for a final product having an octane rating of 100–101 a practical overall space velocity is about 2. On the other hand, a practical overall space velocity of about 1 is satisfactory for producing a final product, leaded gasoline, having an octane rating of 104. Therefore, the preferred total catalyst requirement is a minimum to produce the final product of the required octane rating at the commercially attractive space velocity. Therefore, the space velocity is a function of the on-stream time, is dependent upon the octane requirement of the final product, is dependent upon the selected practical on-stream time, and is controlled by economic considerations.

Similarly, the pressure at which the reforming reaction takes place is selected from a consideration of the economic factors involved. In general, the lower the reactor pressure, the shorter the interval between regenerations, i.e., the shorter the on-stream time.

The recycle ratio, i.e., mol ratio of hydrogen in the recycle gases to naphtha charged to the reactors, has an effect upon the length of the interval between regenerations. However, the recycle ratio within practical limits has little direct bearing upon the yield of final product although it has some effect upon the reactor temperature due to the heat carrier effect upon the temperature differential or $\Delta T$ in the reactors. For practical purposes, the recycle ratio can vary between 4 and 15 mols of hydrogen per mol of naphtha. Preferably, the recycle ratio is selected to be within the limits of 6 to 10 mols of hydrogen per mol of naphtha.

Having determined the total amount of catalyst required to produce a final product having the required octane rating, the distribution of the catalyst in a plurality of reactors is controlled by a single consideration. In the first reactor the naphtha is contacted with the minimum amount of catalyst required to produce a maximum temperature differential between the vapor inlet temperature and the temperature of the autogenous quench point for the particular type of naphtha to be treated.

*Determination of the minimum amount of catalyts required to produce the maximum temperature drop in the first ractor*

The minimum amount of catalyst required to produce a maximum temperature differential between the vapor inlet temperature and the temperature of the autogenous quench point in the first reactor is readily determined from temperature profile curves. For this purpose the reactor temperature in degrees versus the depth of the catalyst bed in a lineal unit or in tons per unit of naphtha is plotted. From the curve so plotted the quench point is determined and the quantity of catalyst calculated from the depth and cross-sectional area of the bed at that depth or read directly from the curve. Thus, considering curves 6 and 7 in Figures 3 and 4 respectively, it is found that the quench point in the first reactor occurs when about 3 tons of catalyst per 10,000 barrels of naphtha per stream day have been contacted. The amount of catalyst contacted in the first reactor before the reactants reach the quench point is substantially the same whether the charge stock be one containing a relatively high concentration or a relatively low concentration of naphthenes. Thus, considering curves 6 and 7 of Figures 3 and 4 the following information is obtained:

Table II

| Charge Naphtha | Vapor Inlet Temp., °F. | Autogenous Quench Point Temp., °F. | Tons of Catalyst Contacted | Temperature Differential, °F. |
| --- | --- | --- | --- | --- |
| Mid-Continent | 965 | 875 | 3 | 90 |
| Kuwait | 965 | 900 | 3 | 65 |

In other words, the minimum amount of catalyst required to dehydrogenate a major portion of the naphthenes present in the charge naphtha, i.e., about 3 tons per 10,000 barrels of naphtha charge per day preferably is charged to the first reactor. However, the dehydrogenation of the balance of the naphthenes originally present in the charge naphtha is resumed after heating the effluent from the first reactor in the second reactor. For practical purposes the dehydrogenation of substantially all, say 85 percent or more, of the naphthenes originally present in the charge naphtha has occurred when the reaction quenches itself in the second reactor as indicated by the point of inflection in the temperature profile curve for the second reactor (curves 8 and 9, Figures 3 and 4 respectively). Accordingly, the present invention provides for ensuring that the naphtha does not contact the catalyst for any appreciable length of time after reaching the reaction quench point when the reaction products contain more than about 15 percent of the naphthenes originally present in the charge naphtha.

Preferably, at least two adiabatic reactors piped for series flow of naphtha therethrough with reheating of the naphtha intermediate successive reactors are employed. Having determined the total amount of catalyst required to produce a final product having the required octane rating, the minimum amount of catalyst to produce the maximum temperature differential between the vapor inlet temperature and the temperature of the autogenous quench point in the first reactor is charged to the first reactor. The quantity of catalyst required in the first reactor is within the limits of about 2.0 to about 5 tons per 10,000 barrels of naphtha per stream day and preferably about 3 to about 4 tons per 10,000 barrels of naphtha per stream day. The balance of the catalyst charged to the unit can be distributed in any proportion provided the amount of catalyst in the second reactor is at least sufficient to provide for the substantial completion of the first stage of the reforming reaction, i.e., the dehydrogenation of the naphthenes. However, it is preferred to distribute the balance of the catalyst required to produce a final product of required octane rating equally in the second and third reactors. Thus, in a unit for treating 10,000 barrels of naphtha per stream day employing three adiabatic reactors and reheating the naphtha between successive reactors, it is preferred to charge about 3.6 tons of platinum-type catalyst to the first reactor and about 18 tons to each of the second and third reactors when operating at an overall space velocity of about 1.36 to produce a leaded gasoline having an octane rating of 104. In other words, the catalyst distribution in the three reactors is in the proportion of 1:5:5.

That is to say, the time of contact of naphtha containing a substantial portion of the naphthenes originally present in the charge naptha and platinum-type reforming catalyst at temperatures below the autogenous quench point is kept at a minimum, preferably zero. The time of contact of naphtha containing a minor proportion of naphthenes, say 15 percent or less of the naphthenes originally present in the charge naphtha has little or no effect upon the yield of gasoline having a leaded octane of about 100 or more. Accordingly, the total amount of catalyst required is the amount necessary to obtain substantial completion of the first stage, i.e., dehydrogenation stage, of the reforming conversion plus the amount of catalyst required to produce dehydrocyclization, hydrocracking and isomerization of the paraffins in the charge stock necessary to produce the required octane rating in the final product. Accordingly, in general the present invention provides for maintaining the charge naphtha in contact with a platinum-type reforming catalyst at a temperature higher than the temperature of the autogenous quench point until at least abou 80 percent of the naphthenes originally present in the charge naphtha has been dehydrogenated. In the preferred embodiment of the present invention the foregoing is achieved by contacting the charge naphtha in the first of a plurality of adiabatic reactors with the minimum amount of platinum-type reforming catalyst required to produce a maximum temperature differential between the naphtha vapor inlet temperature and the autogenous quench point and then subjecting the charge naphtha in the presence of a platinum-type catalyst to temperatures above and below the temperature of the autogenous quench point at a space velocity and pressure to produce a final product having the required octane rating. The increased yield of leaded gasoline having an octane rating of at least 100 can also be obtained by contacting the charge naphtha under substantially isothermal conditions at temperatures above the autogenous quench point until at least 80 to 85 percent of the naphthenes originally present in the charge naphtha is dehydrogenated. Preferably, the reforming of a charge naphtha over platinum-type catalyst is carried out in a unit having at least two, and particularly, three adiabatic reactors provided with facilities to reheat the naphtha to reaction temperature between successive reactors. Accordingly, in an adiabatic three-reactor system charging 10,000 barrels per day of Mid-Continent naphtha to produce gasoline having an octane rating (research+3 cc. TEL) or a leaded octane rating of 104 it is preferred to contact the naphtha in the first reactor with about 2 to 5 tons, preferably about 3 to about 4 tons of particle-form platinum-type reforming catalyst to convert a major portion of the naphthenes present in the naphtha charge stock to aromatic hydrocarbons without yield-reducing residence time in contact with the catalyst at temperatures below about the temperature at which the reaction is self-quenching. The effluent of the first reactor is reheated and charged to a second reactor containing about 18 tons of catalyst. The effluent of the second reactor is reheated and charged to a third reactor containing about 18 tons of catalyst.

The effect of residence time at temperatures below the autogenous quench point upon the yield of gasoline having a leaded octane rating of 104 is made manifest by the comparison of yields of 10 RVP gasoline in an adiabatic three-reactor unit in which the total catalyst charge is distributed equally among the three reactors, i.e., in the proportion of 1:1:1 and the yield of gasoline in the same adiabatic three-reactor unit in which the total catalyst charge is distributed among the three reactors in the proportion of 0.2:1:1 or 1:5:5. The comparable data are presented in Table III.

Table III

[Capacity: 10,000 b./d. Feed: Mid-Continent naphtha. Boiling range: 200° to 380° F.]

| Naphthenes, percent by volume | 45 | |
|---|---|---|
| Catalyst Distribution at 104 Research Leaded Octane | 1:1:1 | 0.2:1:1 (1:5:5) |
| Total Catalyst Charge 3 Reactors (Tons) | 54 | 40 |
| Yields: | | |
| 10 lbs. RVP, percent volume of charge | 80.8 | 84.8 |
| C4+ percent volume of charge | 82.2 | 83.2 |
| C5+ percent volume of charge | 72.4 | 75.8 |
| Dry Gas—weight percent of charge | 15.5 | 13.3 |
| Hydrogen Produced s.c.f./b. of charge | 760 | 870 |

Similar data for the reforming of Kuwait naphtha over a particle-form platinum-type catalyst are set forth in Table IV.

Table IV

[Capacity: 10,000 b./d. Feed: Kuwait naphtha. Boiling range: 200° to 380° F.]

| Naphthenes, volume percent of Charge | 27 | |
|---|---|---|
| Catalyst Distribution at 104 Research Leaded Octane | 1:1:1 | 0.2:1:1 (1:5:5) |
| Total Catalyst Charge 3 Reactors (Tons) | 54 | 40 |
| Yields: | | |
| 10 lbs. RVP, percent volume of charge | 77.2 | 78.2 |
| C4+ percent volume of charge | 80.8 | 80.8 |
| C5+ percent volume of charge | 69.2 | 70.5 |
| Dry gas, percent weight of charge | 17.7 | 17.5 |
| Hydrogen Produced s.c.f./b. of Charge | 580 | 630 |

It will be observed that contacting a platinum-type reforming catalyst with a naphtha to reform said naphtha to a leaded octane rating of at least 100 when the catalyst is distributed among three adiabatic reactors in the proportion of 1:5:5 or, in other words, when the catalyst is distributed among the three reactors in such a manner that the residence time of a naphthene-containing fraction in contact with the platinum-type catalyst at temperatures below the autogenous quench point is substantially zero produces an increased yield of gasoline having a leaded octane rating of at least 100 dependent upon the naphthene content of the charge naphtha. This is manifest from the comparison of data provided in Tables III and IV and summarized in Table V.

Table V

| Catalyst Distribution, 3 Reactors | 1:5:5 | |
|---|---|---|
| Charge Naphtha, Type: | Mid-Continent | Kuwait |
| Percent Volume Naphthenes in Charge | 45 | 27 |
| Percent Increase Yield of 10 RVP Gasoline Compared to Yield at 1:1:1 Catalyst Distribution | 4.0 | 1.0 |

The catalyst distribution of 1:5:5 (0.2:1:1) shows a similar yield advantage over catalys distributions other than 1:1:1. Thus, for example, when the same catalyst is distributed in three reaction zones in the proportion of 1:1:2 the yield of gasoline having a leaded octane rating of 104 is less than the yield when reforming the same feed naphtha to the same octane rating over the same catalyst distributed in three reaction zones in the proportion of 1:5:5. The data exemplifying these facts are presented in Table VI.

Table VI

[Feed: Mid-Continent naphtha. BR 200° to 380° F. Octane No. (R+3 cc.)=72. Octane No. Gasoline (R+3 cc.)=104.]

| Catalyst Distribution | 1:1:1 | 1:1:2 | 1:5:5 |
|---|---|---|---|
| 10 RVP, Percent Volume of Charge | 80.8 | 80.8 | 84.8 |
| Dry Gas, Percent Weight of Charge | 15.5 | 15.5 | 13.3 |

While one percent increase in the yield at 104 octane number may appear to be insignificant, it represents an increased income of $200,000 per year in a plant treating 10,000 barrels per stream day. It will also be noted that when producing 104 octane number (R+3 cc.) leaded gasoline catalyst distributions of 1:1:1 and 1:1:2 are equivalent in their effect upon yield. Of course, all will recognize that when the catalyst is distributed in the proportion of 1:1:2 the amount of catalyst in the second reforming zone is at least equal to the amount of catalyst in the first reforming zone and the amount of catalyst in the third reforming zone is greater than the amount of catalyst in either the first or second reforming zones.

The data presented hereinbefore clearly establish that there is a yield advantage when reforming naphthene containing charge naphtha over a platinum-type catalyst when the residence time of the naphthene-containing charge at temperatures below the temperature at which the dehydrogenation of naphthenes is self-quenching is preferably zero. Or stated in other words, when the catalyst-to-oil ratio in the first stage of the reforming reaction, i.e., the stage in which the predominating reaction is conversion of a major portion of the naphthenes originally present in the charge naphtha to aromatics is about 2 to about 5 tons of catalyst per 10,000 barrels of charge naphtha per day. That is to say, in the first stage, regardless of the number of reactors, the predominating reaction is dehydrogenation of naphthenic hydrocarbons to aromatic hydrocarbons. Until that reaction, i.e., dehydrogenation of naphthenic hydrocarbons to aromatic hydrocarbons is substantially complete, i.e., at least 85 percent of the naphthenes originally present are dehydrogenated to aromatics, the residence time of the naphthene-containing charge in contact with platinum-type reforming catalyst at temperatures below the autogenous quench point is a minimum, preferably zero. After the dehydrogenation of naphthenic hydrocarbons to aromatic hydrocarbons has been completed or substantially completed, the residence time of the charge stock in contact with platinum-type reforming catalyst at temperatures below the autogenous quench point is of little significance. This limitation is satisfied in a practical manner by limiting the catalyst ratio to about 2 to about 5 tons of catalyst per 10,000 barrels of feed per day until a major portion of naphthenic hydrocarbons has been converted to aromatic hydrocarbons.

Those skilled in the art will understand that because of loss in yield due to thermal effects the vapor inlet temperature to any reactor is limited to that at which loss in yield due to thermal conversion is minimized. Presently, it is preferred to employ inlet temperatures not exceeding about 980° to about 990° F. Consequently, after contacting the naphthene-containing charge naptha in the first stage at a catalyst rato of about 2 to about 5, preferably about 3.5 tons of catalyst per 10,000 barrels of feed per day, the catalyst-to-oil-ratio in the second stage, i.e., the stage in which the paraffins of the feed are dehydrocyclized, and/or isomerized, and/or hydrocracked is dependent upon the amount of catalyst required to produce the required leaded octane rating of 100 or higher. Accordingly, for a plurality of adiabatic reactors treating 10,000 barrels of charge naphtha per day it is preferred to contact the charge naphtha with about 2 to about 5, preferably about 3.5, tons in the first reactor to provide th minimum amount of catalyst for the maximum temperature drop in th reactor. Thereafter, in one or more reactors the charge naphtha is contacted with about 40 tons of platinum-type catalyst per 10,000 barrels per stream day of charge naphtha in order to produce a gasoline having a leaded octane number of 104. For practical reasons, e.g., the need to reheat the hydrocarbons after the temperature thereof has ceased to decrease substantially in the second reactor, it is preferred to use three reactors with the catalyst distribution and vapor inlet and outlet temperatures as set forth in Table VII.

*Tabl VII*

[Capacity: 10,000 barrels per day. Leaded gasoline—104 O.N]

|  | Reactor No. 1 | Reactor No. 2 | Reactor No. 3 |
|---|---|---|---|
| Tons Platinum-Type Catalyst | 3.5 | 18 | 18 |
| Vapor Inlet Temp., ° F | 965 | 965 | 965 |
| Vapor Outlet Temp., ° F | 855 | 926 | 965 |

In the unit for which data is given in Table VII the conversion of the naphthenic hydrocarbons in a Mid-Continent naphtha to aromatic hydrocarbons is about 60 percent completed in the first reactor. The conversion of the balance of the naphthenic hydrocarbons to aromatic hydrocarbons is substantially completed in the second reactor and the dehydrocyclization and/or hydrocracking and/or isomerization of the paraffinic hydrocarbons of the charge naphtha is initiated in the second reactor and carried to the required degree in the third reactor to produce the gasoline having a leaded octane number of 104.

The amount of catalyst in the first reactor is substantially the minimum required for maximum temperature drop in the first reactor. Accordingly, while less catalyst can be used in the first reactor, a substantially greater amount of catalyst (except under substantially isothermal conditions) cannot be used in the first reactor because the residence time of the naphthene-containing charge at temperatures below the autogenous quench point, i.e., the temperature at which the dehydrogenation reaction is self-quenching would be finite and deleterious.

Where a unit having a plurality of adiabatic reactors designed for a catalyst charge to the first reactor in excess of the minimum required to produce a maximum temperature differential between the vapor inlet temperature and the autogenous quench point is to be converted to a unit in which the first reactor contains the minimum amount of catalyst to produce the aforesaid maximum temperature differential, it is preferred to replace the excess catalyst with pellets of inert material such as fused silica, alumina, etc. The curves 10 and 11 of Figures 3 and 4 respectively are illustrative of the conversion of a unit in which the first reactor had catalyst capacity far in excess of that required to produce the aforesaid maximum temperature differential. The excess catalyst was replaced in the lower part of the bed by fused silica. Although the hydrocarbon mixture containing in excess of 15 percent of the naphthenes originally present in the charge naptha was in contact with the inert fused silica at temperatures below the autogenous quench point the yield of 10 RVP gasoline was 4.0 percent greater when reforming Mid-Continent naphtha.

The present invention accordingly provides a means for producing leaded gasolines having a research octane number of at least about 100 in improved yields of economically important magnitude. The present invention provides for contacting charge naphtha with a particle-form platinum-type catalyst at temperatures higher than the temperature of the autogenous quench point until at least about 80 to about 85 percent of the naphthenes in the original charge naphtha is converted to aromatics. The vapor inlet temperatures to all of the adiabatic reactors can be the same, the vapor inlet temperature of the adiabatic reaction zones other than the first can be higher or lower than the vapor inlet temperature of the first reaction zone, and the vapor inlet temperatures of the reaction zones other than the first and second reaction zones can be higher or lower than the vapor inlet temperatures of the first and second reaction zones. The present invention provides specifically for contacting naphtha in three adiabatic reactors in which the platinum-type catalyst is distributed to provide in the first reactor a minimum amount of catalyst to produce a maximum differential between the vapor inlet temperature and the temperature of the autogenous quench point and the balance of the catalyst required to produce a leaded gasoline having a research octane number of at least about 100 is distributed equally between the other two reactors. The present invention provides for a catalyst-to-oil ratio per hour in the first adiabatic reaction zone of about 0.033 to about 0.083 and preferably about 0.067 and amounts of catalyst in the second and third zones substantially equal with the amount of catalyst in the second zone about 3 to about 10, preferably about 5 times the amount of catalyst in the first zone. The present invention provides for a catalyst-to-oil ratio per hour in the second and third zones of about 0.24 to about 0.4 preferably about 0.33, and a space velocity in the first zone of about 12 to about 30 v./hr./v., and in the second and third zones about 2.5 to about 4. The present invention presently contemplates an overall space velocity of about 0.5 to about 3.0. The vapor inlet temperature to each reforming zone is within the range of about 900° to about 980° F. dependent upon the required leaded octane number of the gasoline produced and the age of the catalyst. The pressure in each zone is about 100 to about 1000 p.s.i.g.

Accordingly, the present invention provides a method for reforming naphtha which comprises maintaining the temperature of naphtha in contact with platinum-type reforming catalyst above the temperature of the autogenous quench point until at least about 80 to about 85 percent of the naphthenes originally present is dehydrogenated, and then subjecting the charge naphtha to reforming conditions of temperature, pressure and space velocity to produce a gasoline having the required octane rating. The present invention also provides for contacting in a first adiabatic reaction zone a charge naphtha at reforming temperature and pressure with a minimum amount of platinum-type reforming catalyst to provide a maximum temperature differential between the vapor inlet temperature and the temperature of the autogenous quench point and thereafter contacting said charge naphtha with platinum-type reforming catalyst under reforming conditions of temperature pressure and space velocity to produce a gasoline having a leaded octane number of at least 100. The present invention also provides a method for reforming naphtha which comprises contacting a charge naphtha under reforming conditions of temperature, pressure and space velocity in a first adiabatic reaction zone with a minimum amount of platinum-type catalyst to produce a maximum differential between the vapor inlet temperature and the temperature of the autogenous quench point, reheating the effluent of said first adiabatic reaction zone to reforming temperature, contacting said reheated effluent with platinum-type reforming catalyst in a second adiabatic reaction zone under reforming conditions of temperature, pressure and space velocity, reheating the effluent of said second adiabatic reforming zone to reforming temperature, and contacting in a third adiabatic reaction zone said reheated effluent of said second adiabatic reaction zone with platinum-type catalyst under reforming conditions of temperature and pressure to produce a leaded gasoline having a research octane number of at least 100. Furthermore, the present invention provides a method of reforming naphtha which comprises contacting naphtha with platinum-type reforming catalyst under reforming conditions of temperature and pressure, maintaining the temperature of said naphtha in contact with said platinum-type catalyst above the temperature of the autogenous quench point until at least about 80 to about 85 percent of the naphthenes originally present in said charge naphtha is dehydrogenated, and contacting said charge naphtha containing not more than about 15 to about 20 percent of the naphthenes originally present with reforming catalyst under reforming conditions of temperature, pressure and space velocity to produce a leaded gasoline having a research octane number of at least 100. The present invention also provides for reforming naphtha in contact with platinum-type reforming catalyst in a plurality of adiabatic reactors piped for series flow of naphtha successively through said plurality of adiabatic reactors and provided with facilities for reheating said naphtha intermediate successive adiabatic reactors in which the charge naphtha is contacted with about 2 to about 5, preferably about 3.5 tons of platinum-type reforming catalyst in a first adiabatic reactor, and contacting said naphtha under reforming conditions of temperature, pressure, and space velocity with an amount of platinum-type reforming catalyst in the remainder of said plurality of adiabatic reactors to produce leaded gasoline having a research octane number of at least 100.

The present invention also provides for maintaining the time of contact of naphtha and reforming catalyst at temperatures below the temperature of the autogenous quench point to a minimum, preferably zero until substantially all, e.g., at least about 80 to about 85 percent of the naphthenes originally present in the charge naphtha is dehydrogenated and subjecting the so-treated naphtha to reforming temperatures above or below the temperature of the autogenous quench point.

I claim:

1. In the method of reforming naphtha which comprises passing a charge naphtha and hydrogen in series flow through a plurality of reforming reaction zones each of which contains platinum-containing reforming catalyst at reforming temperature and pressure and at an overall liquid hourly space velocity dependent upon the total volume of the aforesaid reforming catalyst with which the aforesaid charge naphtha is contacted in all of the aforesaid plurality of reforming reaction zones, reheating the effluent of each of the aforesaid plurality of reforming reaction zones to reforming temperature prior to introducing said effluent into the next reforming reaction zone in the series, and recovering a reformate, the improvement which comprises contacting the aforesaid charge naphtha with the aforesaid reforming catalyst at a substantially constant liquid hourly space velocity in the first reforming reaction zone independent of the aforesaid overall liquid hourly space velocity at reforming temperatures higher than the autogenous quench point of the dehydrogenation of naphthenes to produce a reaction mixture having a temperature substantially that of the autogenous quench point, separating said reaction mixture from the aforesaid reforming catalyst substantially when the temperature of said reaction mixture first reaches substantially the temperature of the aforesaid autogenous quench point, contacting the aforesaid separated reaction mixture in the subsequent reforming zones with the aforesaid reforming catalyst at reforming conditions of temperature, pressure, and liquid hourly space velocity to produce leaded gasoline having a research octane number of at least 100, and maintaining the temperature of the aforesaid reaction mixture in contact with the aforesaid reforming catalyst above that of the autogenous quench point whilst said reaction mixture contains more than about 20 percent of the naphthenes originally present in the aforesaid charge naphtha to ensure minimum time of contact of said reaction mixture containing more than 20 percent of the naphthenes originally present in the charge naphtha with the aforesaid reforming catalyst at temperatures below the temperature of the aforesaid autogenous quench point.

2. The improvement set forth and described in claim 1 wherein at least the reforming reaction zones subsequent to the first reforming reaction zone of the aforesaid plurality of reforming reaction zones are adiabatic reforming reaction zones.

3. In the method set forth and described in claim 1 the improvement which comprises contacting the aforesaid charge naphtha with the aforesaid reforming catalyst in the first of the aforesaid plurality of reforming reaction zones at a substantially constant liquid hourly space velocity independent of the aforesaid overall liquid hourly space velocity, regulating the temperature of the aforesaid naphtha and hydrogen entering said first reaction zone with respect to the amount of the aforesaid reforming catalyst in the catalyst bed in the aforesaid first reforming reaction zone not exceeding the ratio of 5 tons per 10,000 barrels of said charge naphtha contacted per day, and the activity thereof in the aforesaid first reforming reaction zone to ensure that the reaction temperature in said catalyst bed in the aforesaid first reforming reaction zone does not go below the temperature of the autogenous quench point until at least about 80 to about 85 percent of the naphthenes in the aforesaid charge naphtha is dehydrogenated to obtain a first reforming reaction zone effluent containing not more than about 20 percent of the naphthenes originally present in the aforesaid charge naphtha, and contacting said first reforming reaction zone effluent in the reforming reaction zones subsequent to the first of said plurality of reforming reaction zones with the aforesaid reforming catalyst at reforming conditions of temperature, pressure, and liquid hourly space velocity to produce leaded gasoline having a research octane number of at least 100.

4. In the method set forth and described in claim 1 the improvement which comprises contacting the aforesaid charge naphtha with the aforesaid reforming catalyst in the first of the aforesaid plurality of reforming reaction zones at a substantially constant liquid hourly space velocity independent of the aforesaid overall liquid hourly space velocity, with the minimum amount of the aforesaid reforming catalyst not in excess of the proportion of 5 tons per 10,000 barrels of charge naphtha per day to produce a maximum temperature differential between the vapor inlet temperature of said first reforming reaction zone and the temperature of the autogenous quench point to obtain a first reforming reaction zone effluent, and contacting said first reforming reaction zone effluent in the reforming reaction zones of said plurality of reforming reaction zones subsequent to the aforesaid first reforming reaction zone with the aforesaid reforming catalyst at reforming conditions of temperature, pressure, and liquid hourly space velocity to produce leaded gasoline having a research octane number of at least 100.

5. In the method set forth and described in claim 1 the improvement which comprises contacting the aforesaid charge naphtha in a first adiabatic reforming reaction zone at a substantially constant liquid hourly space velocity independent of the aforesaid overall liquid hourly space velocity with the minimum amount of the aforesaid reforming catalyst not in excess of the proportion of 5 tons per 10,000 barrels of charge naphtha per day to produce a maximum temperature differential between the vapor inlet temperature of said first adiabatic reforming reaction zone and the temperature of the autogenous quench point, contacting the effluent of said first adiabatic reforming reaction zone under reforming conditions of temperature, pressure, and liquid hourly space velocity in at least two additional adiabatic reforming reaction zones containing substantially equal amounts of said reforming catalyst, the amount of reforming catalyst in the second adiabatic reforming reaction zone being about 3 to about 10 times the amount of said reforming catalyst in said first adiabatic reforming reaction zone, to produce leaded gasoline having a research octane number of at least 100.

6. In the method set forth and described in claim 1 the improvement which comprises contacting the aforesaid charge naphtha with the aforesaid reforming catalyst in the first of the aforesaid plurality of reforming reaction zones at a substantially constant liquid hourly space velocity independent of the aforesaid overall liquid hourly space velocity, with the aforesaid reforming catalyst in the proportion of about 2 to about 5 tons of the aforesaid reforming catalyst per 10,000 barrels of the aforesaid charge naphtha per day to produce a maximum temperature differential between the vapor inlet temperature of said first reforming reaction zone and the temperature of the autogenous quench point to obtain a first reforming reaction zone effluent, and contacting said first reforming reaction zone effluent in the reforming reaction zones of said plurality of reforming reaction zones subsequent to the aforesaid first reforming reaction zone with the aforesaid reforming catalyst at reforming conditions of temperature, pressure, and liquid hourly space velocity to produce leaded gasoline having a research octane number of at least 100.

References Cited in the file of this patent

UNITED STATES PATENTS

| | | |
|---|---|---|
| 2,573,149 | Kassel | Oct. 30, 1951 |
| 2,654,694 | Berger et al. | Oct. 6, 1953 |
| 2,781,298 | Haensel et al. | Feb. 12, 1957 |
| 2,861,942 | Beckberger | Nov. 25, 1958 |